United States Patent [19]

Rattin et al.

[11] Patent Number: 4,494,866
[45] Date of Patent: Jan. 22, 1985

[54] APPARATUS FOR SCANNING AN ORIGINAL FOR COPIERS HAVING A VARIABLE REDUCING/ENLARGEMENT RATIO

[75] Inventors: Luciano Rattin, Ivrea; Amerigo Vigliermo, Baio Dora, both of Italy

[73] Assignee: Ing. C. Olivetti & C., S.p.A., Ivrea, Italy

[21] Appl. No.: 449,388

[22] Filed: Dec. 13, 1982

[30] Foreign Application Priority Data

Dec. 21, 1981 [IT] Italy ................................ 68650 A/81

[51] Int. Cl.³ ...................... G03B 27/34; G03B 27/40; G03B 27/70
[52] U.S. Cl. .......................................... 355/57; 355/8; 355/58; 355/60
[58] Field of Search ............... 355/57, 58, 60, 8, 14 R, 355/59

[56] References Cited

U.S. PATENT DOCUMENTS 3,614,222 10/1971 Post et al. ................................ 355/8
3,884,574 5/1975 Doi et al. ............................. 355/8 X
4,000,943 1/1977 Bar-on ................................. 355/8
4,218,735 8/1980 McCutcheon .................... 355/14 R Primary Examiner—L. T. Hix
Assistant Examiner—Douglas S. Lee
Attorney, Agent, or Firm—W. R. Hulbert

[57] ABSTRACT

A first carriage carries a lamp for illuminating the original and a first mirror. A second carriage carries two mirrors and moves at half the speed of the carriage so that a constant optical path length is maintained from the original, via the three mirrors and a focusing lens to a rotating image receptor drum. The carriages are driven by individual motors via pulleys and belts and, during scanning, the speeds of the two motors are controlled in sympathy to move the carriage at a speed corresponding to the selected reduction/enlargement factor and to move the carriage at half this speed. Before scanning, only the second motor is energized to position the second carriage in accordance with the said factor. In a modified embodiment, a clutch couples the two carriages for movement at the correct relative speeds during scanning which is effected solely by means of the first motor. The initial positioning of the carriage by the second motor is effected with the clutch disengaged.

6 Claims, 8 Drawing Figures

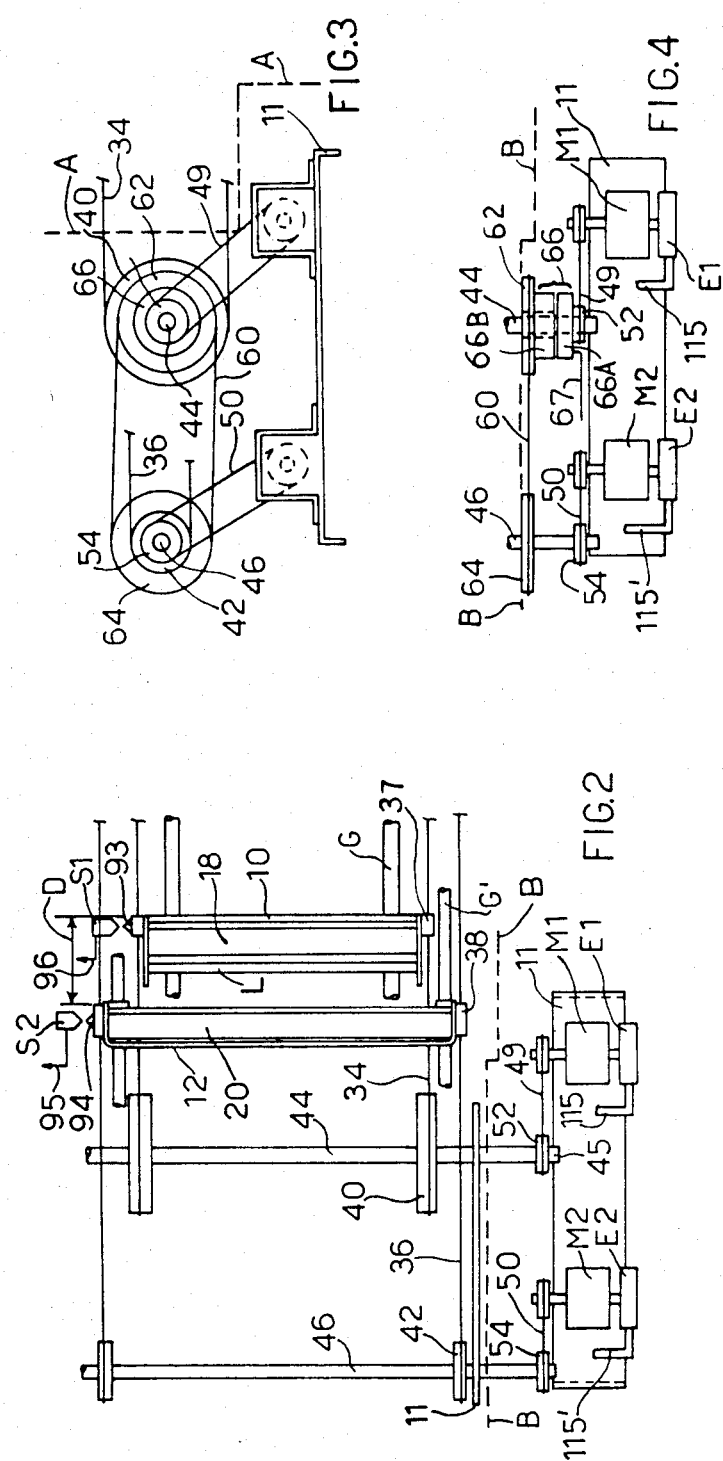

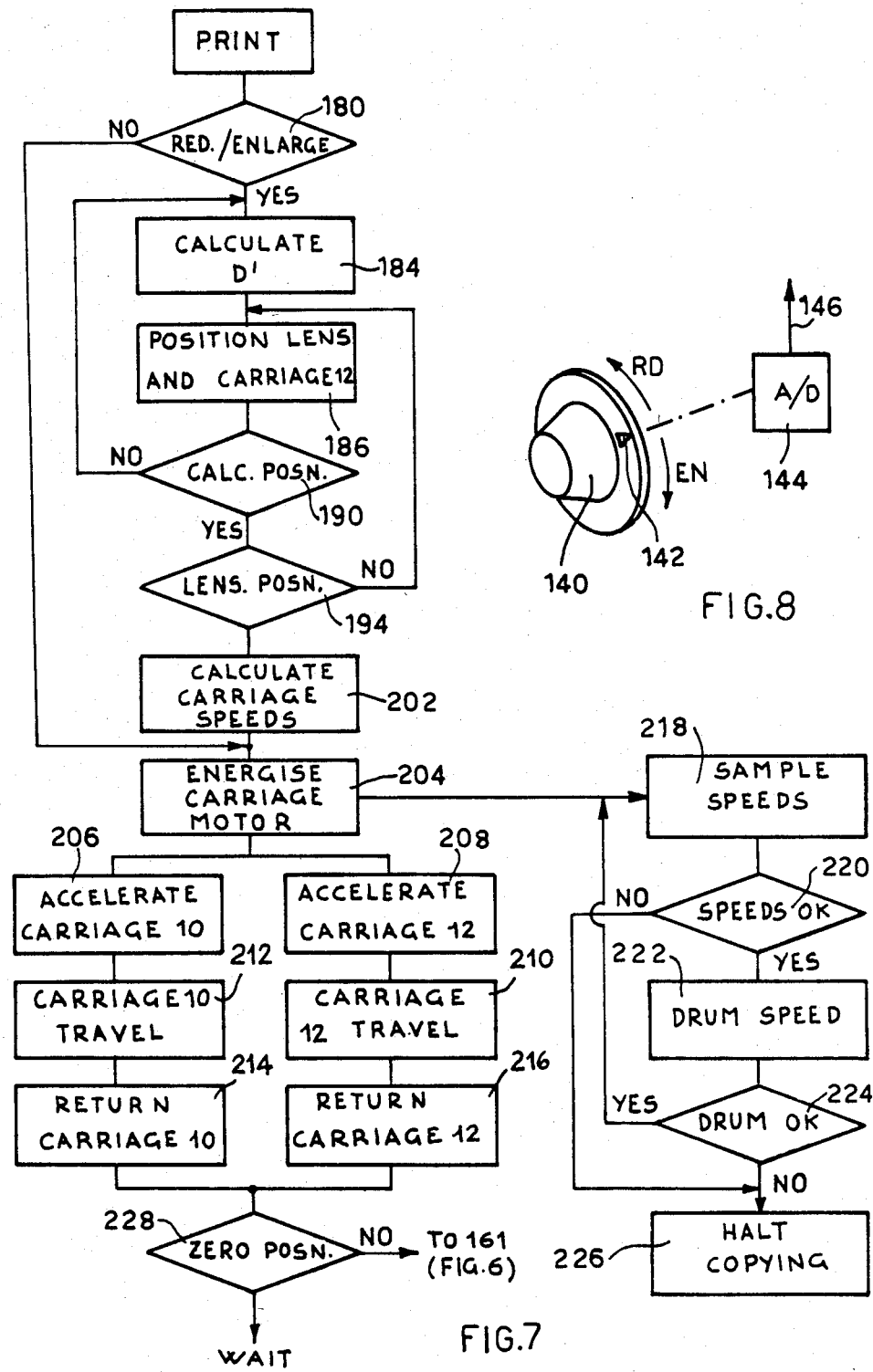

APPARATUS FOR SCANNING AN ORIGINAL FOR COPIERS HAVING A VARIABLE REDUCING/ENLARGEMENT RATIO

BACKGROUND OF THE INVENTION

The present invention relates to an apparatus for scanning an original, for copier machines, with a continuously variable reducing-enlargement ratio, and to the associated control circuit.

In copiers with illumination of the original, for scanning thereof, a first carriage which carries a lamp and a first mirror is moved parallel to the surface for exposure of the original, at a constant speed $V_c$. A second carriage which carries one or more mirrors is moved parallel to the first carriage at a speed $V_c/2$. The movement of the second carriage is derived from the first carriage by means of a pulley rotatably mounted on the second carriage and a cable having one end anchored to the first carriage, and the other end anchored to a fixed point of the frame structure.

With a reduction ratio of 1:1, as is known, the speed V of the first carriage is equal to the peripheral speed of the drum on which the latent image of the original is formed, while the speed $V_c/2$ of the second carriage is necessary to maintain constant the length of the optical path of the light rays during the scanning stroke of the first carriage.

When the reducing or enlargment ratio changes, it is necessary to alter the speed of the first carriage by an amount which is proportional to the above-mentioned ratio and it is also necessary to modify the initial position of the second carriage with respect to the first carriage by a predetermined amount which also depends on the geometry of the optical system.

In the known copiers, the position of the second carriage with respect to the first carriage is varied by moving the anchorage point of the control cable, by means of levers and cams. In a copier which is known for example U.S. Pat. No. 3,614,222, the movement of the two carriages is produced by an arrangement formed by levers, cable-type return motion means and variableprofile cams to couple the motion of the drum motor to the first carriage and move it at at most three different speeds corresponding to that number of reduction ratios.

However, such an arrangement is very complicated. In addition, it requires a motor with a power output which is higher than that required for rotating the drum and which is used only for short periods in any copying cycle. In another copier which is known for example from published European patent application EP No. 30282, it has already been proposed that the two carriages which are connected by pulleys and cables should be moved by means of a common electric motor, the movement of which is synchronized with the movement of the drum by means of a microprocessor. However, that arrangement is also complicated and expensive to produce.

SUMMARY OF THE INVENTION

The object of the present invention is to provide an apparatus for scanning an original, which is structurally simple, small in dimensions and reliable in operation. The abovementioned object is met by the scanning apparatus according to the invention, which is characterised in that each of the two carriages has a corresponding autonomous electric motor and by a control circuit capable of activating the carriage motors independently of each other and independently of the movement of the rotatable image receptor.

BRIEF DESCRIPTION OF THE DRAWINGS

The invention will now be described in more detail, by way of example, with reference to the accompanying drawings, in which:

FIG. 2 is a diagrammatic plan view of the apparatus of FIG. 1,

FIG. 3 is a view of part of an alternative form of the apparatus of FIG. 1,

FIG. 4 is a plan view of the embodiment shown in FIG. 3,

FIG. 7 is a flow chart in respect of control of the apparatus shown in FIG. 1, and FIG. 8 shows a detail view of a construction for setting a desired reducing ratio.

DESCRIPTION OF THE PREFERRED EMBODIMENT

Figure 1:
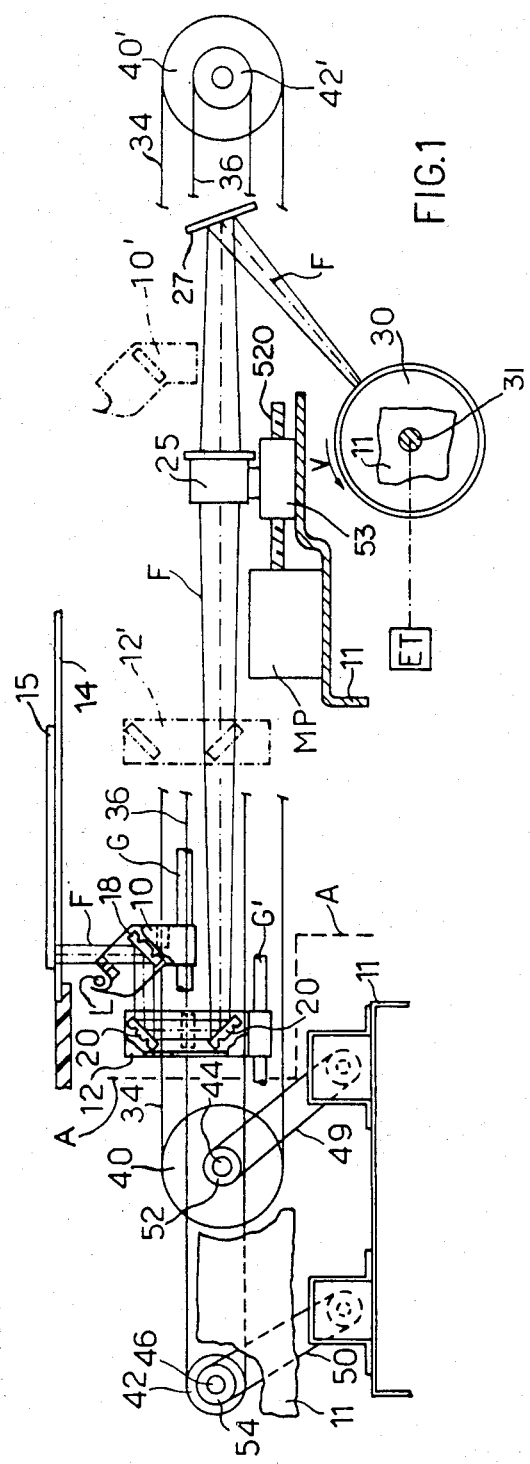
FIG. 1 is a diagrammatic view of a scanning apparatus embodying the invention.

Referring to FIGS. 1 and 2, the original scanning apparatus for a copier, embodying the invention, comprises two carriages 10 and 12 which are slidable on guides G and G' respectively, parallel to a surface 14 for exposure of an original 15. The carriage 10 carries a lamp L for illuminating the original 15, while the two carriages 10 and 12 respectively carry mirrors 18 and 20 which are oriented in such a way as to direct the light beam F reflected by the original 15 towards an objective lens 25. The lens 25 focuses the beam F, after further reflection at a fixed mirror 27, onto a drum 30 (image receptor) which is rotatable on the frame structure 11 of the copier, at a constant, predetermined peripheral speed V. The two carriages 10 and 12 are required to move at speeds relative to each other in a constant ratio equal to 1:½ to maintain the image of the original constantly focused on the drum 30 throughout the scanning movement of the carriage 10; thus, when the carriage 10 is at the end of its travel at 10' (see FIG. 1), the carriage 12 will have covered a distance equal to half the travel of the carriage 10, and will be at position 12'. For that purpose, in accordance with a first aspect of the invention, each of the two carriages 10 and 12 is moved by its own autonomous d.c. motor M1 and M2 respectively, (FIG. 2), each motor being controlled independently of the others, as will be described hereinafter. The two carriages 10 and 12 are moved by belts 34 and 36 which are respectively anchored at points 37 and 38 on the carriages 10 and 12. The belts 34 and 36 are respectively passed around two pairs of pulleys 40, 40' and 42, 42', of which the pulleys 40 and 42 are of larger and smaller diameters and are fixed on spaced, parallel shafts 44 and 46 which are rotatable in the frame structure 11 of the copier. The pulleys 40 and 40' are of equal diameter and the pulleys 42 and 42' are of equal diameter, the pulleys 40' and 42' being loose on a common shaft spaced from the shafts 44 and 46. The shafts 44 and 46 are respectively rotated by the two d.c. motors M1 and M2 by means of belt transmissions 49 and 50 respectively. In particular, the motor M1 drives the belt 49 to rotate a pulley 52 which is fixed to one end of the shaft 44. The motor M2 drives the belt 50 to rotate a pulley 54 which is fixed on the shaft 46. When the original 15 is to be reduced in a reducing ratio of 1:K (K being the reduction factor), it is necessary in known manner to increase the initial distance D of the carriage 12 from the carriage 10 and to move the objective lens 25 towards the drum 30, that is to say, towards the right in FIG. 1, by a predetermined distance, depending on the preselected reduction factor, while movement in the opposite direction is required when an original is to be enlarged. In addition, the speed of the carriage 10 will have to be increased with respect to the normal speed $V_c$, in proportion to the preselected reduction factor, and vice-versa when the original is to be enlarged.

As already indicated above, the lens 25 is axially movable to permit correct focusing of the image of the original which is reflected onto the drum 30 in various conditions of enlargement or reduction. The lens 25 is moved by means of a stepping motor MP which rotates a screw 520 which is engaged in a support 53 for the lens 25 which is movable on the frame structure 11, A second embodiment is shown in FIGS. 3 and 4 illustrating the alterations with respect to the arrangement shown in FIGS. 1 and 2, relating to the parts to the left of the line A—A in FIG. 1 and the parts below the line B—B in FIG. 2 respectively. In accordance with the second embodiment, the motor M2 is used only for regulating the initial position of the carriage 12 with respect to the carriage 10, while the motor M1 is used for moving both the carriage 10 and the carriage 12 at a speed which is half that of the carriage 10. For that purpose, the shafts 44 and 46 are kinematically connected together by a belt 60 which is trained around a pulley 62 which is rotatable on the shaft 44 and another pulley 64 of the same diameter, which is fixed on the shaft 46.

Disposed on the shaft 44 between the pulleys 52 and 62 is an electromagnetically operated clutch 66 of the type which is engaged when it is deenergized, and comprising a drive portion 66a which is fixed on the shaft 44, and a driven portion 66b which is connected to the pulley 62, this pulley and the driven portion 66b being loose on the shaft 44.

Figure 5:
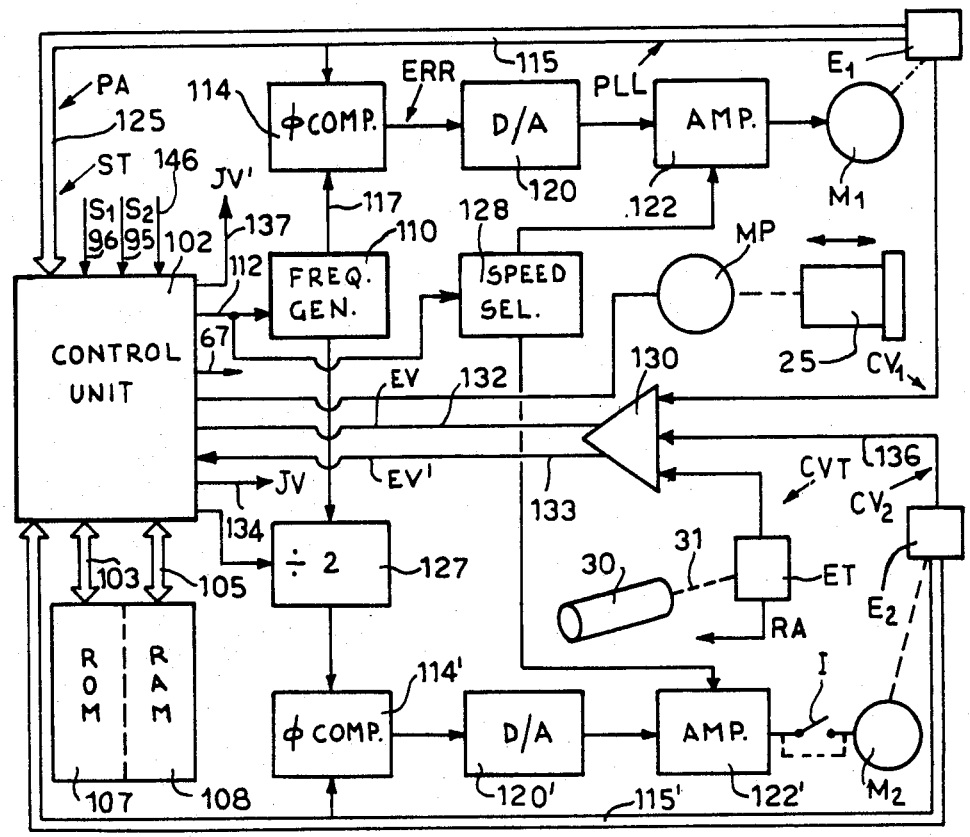
FIG. 5 is a block circuit diagram of the control circuit of the apparatus shown in FIG. 1.

To vary the distance D in dependence on a preselected reducing/enlargement ratio, the clutch 66 is opened by means of an energization signal supplied on a line 67 by a control unit 102 (FIG. 5). In that manner, the driven portion 66b is disengaged from the drive portion 66a, whereby the pulley 62 rotates freely on the shaft 44. At the same time, the motor M2 is supplied with power to cause only the shaft 46 to rotate, by means of the belts 50 and the pulley 54; the drive to the shaft 46 causes the carriage 12 to move independently of the carriage 10. After having regulated the distance D between the two carriages 10 and 12, the clutch 66 is closed, thus restoring the necessary connection between the shafts 44 and 46. At the same time, the motor M2 is electrically isolated from its control circuit by opening of a switch I connected in series with the motor, to avoid wasting energy in that, when the motor M1 is in operation, the motor M2 is in turn rotated by the motor M1, by way of the belts 60, 50 and the pulleys 64, 54. In order to produce the constant ratio 1:½ between the speeds of the carriages 10 and 12, assuming that the shafts 44 and 46 are rotated at the same angular speed by the motor M1, the pulley 40 must be double the diameter of the pulley 42.

The initial position of the carriages 10 and 12 as shown in FIGS. 1 and 2 is sensed by two sensors S1 and S2 respectively, each of which generates a signal when the corresponding carriage reaches such a position as to initiate a copying cycle. Since the angular positions of the shafts of the motors M1 and M2 unequivocally correspond to the position of each carriage along the path of its operating movement, the position can be determined by means of rotary disc type encoders E1 and E2 which are fixed on the shafts of the motors M1 and M2. Any known type of rotary encoder can be used in conjunction with the motors M1 and M2, for example the encoder described in published Italian patent application No. 69951-A/77 dated Dec. 20, 1977, to the present applicants.

Each encoder generates two periodic signals which are phase-shifted at 90° relative to each other, plus a zero signal, in each revolution of the encoder, such signals therefore being representative, as is known, of the speed, direction of rotation and angular motion of the shaft on which the encoder is fitted. The above-described scanning apparatus is controlled, during operation thereof, by a control circuit indicated by the block circuit diagram shown in FIG. 5.

A control unit 102 of any one of the known types, for example an eight bit microprocessor, is connected by the channels 103 and 105 to two memories, namely a ROM 107 and a RAM 108 respectively. As is known, the memory 107 permanently contains the instructions of the program for controlling the mode of operation of the apparatus, besides other invariable data used by the unit 102 during execution of the program. The reading and writing memory 108 temporarily stores all the information and data exchanged between the control unit 102 and the various operating components of the control circuit. A frequency generator 110 is capable of generating a predetermined number of various frequencies which can be selected under the control of the central unit 102 by means of the connection 112 in dependence on the required reducing or enlarging ratio. The desired reducing ratio can be manually set by operating a rotary knob 140 (see FIG. 8) which is provided with a pointer 142 and which is movable to the various reducing positions indicated by RD and enlarging positions indicated by EN. The knob 140 acts on an analog-digital converter 144 which passes information representing the set reducing or enlarging ratio to the unit 102 by way of a connection 146. The unit 102, in dependence on the information received from the converter 144, also controls a speed selector 128 connected to an amplifier 122 for selecting in known manner a voltage for supplying power to the motor M1, to cause it to rotate at a predetermined speed in relation to the set reducing or enlarging ratio. The unit 102 also controls the stepping motor MP of the lens 25 for correctly positioning it in dependence on the preselected reduction/enlargement factor. The motors M1 and M2 are controlled autonomously and independently by means of two identical circuits, as shown in FIG. 5. Therefore, only the circuit relating to the motor M1 will be described in detail herein. Control and regulation of the speed of the motor M1 are effected in known manner by means of PLL feedback (Phase Locked Loop), that is to say, by comparing the phases of a PLL feedback signal generated by the encoder E1 on a connection 115, and a signal generated by the generator 110 at a frequency selected by the unit 102 in dependence on the preselected reducing or enlarging ratio. That comparison is effected by a phase comparator 114 which receives a signal at a constant frequency from the generator 110 by way of a connection 117, and compares it to the feedback signal, consequently generating an error signal ERR in digital form.

The signal ERR is converted into an analog form by a converter 120 and applied to the power amplifier 122 which supplies power to the motor M1, so that any variation in speed of the motor M1 is immediately nullified, by virtue of the action of the feedback circuit formed by the components E1, 115, 114 and 120.

The encoder E1 is also connected to the unit 102 by way of a connection 125, for transmitting thereto a signal PA which is indicative of the instantaneous angular position of the motor M1, and a strobe signal ST which is generated by the encoder E1 in each revolution of the motor M1. As already stated hereinbefore, the motor M2 which moves the carriage 12 must rotate at a constant speed which is half the speed of the motor M1. That is effected by means of an amplifier 122' which is similar to the amplifier 122 and which, under the control of the speed selector 128, supplies the motor M2 with power which is half that of the amplifier 122. Control of the speed of the motor M2 is effected in generally the same manner as in respect of the motor M1, except that the reference frequency supplied to a phase comparator 114' similar to the comparator 114 is derived in this case from the generator 110 by way of a divider 127 for dividing by two.

As already indicated hereinbefore, the drum 30 rotates at a constant peripheral speed V (see FIG. 1) which is the same as the speed at which the carriage 10 is to move when the reducing ratio is 1:1. The peripheral speed of the drum 30 is kept constant at the nominal value V with any one of the control circuits which are known in the art, that circuit not being shown in the drawings. As a feedback signal, the control circuit uses a signal RA which is generated by an encoder ET connected to the rotary shaft 31 of the drum 30. The motor M1 should move the carriage 10 at a speed $V_c$ which differs from the peripheral speed V of the drum by a relative amount $\pm \Delta V = (V_c - V)/(V)$ which is not higher than a preset value, for example between 0.0005 and 0.01, since the consequence of such a difference in speed on the quality of the copy may be deemed to be generally negligible. Whenever the speeds $V_c$ and V differ by a relative amount greater than $\Delta V$, the control circuit signals the anomaly and operation of the copier is stopped at the end of the copying cycle which is in the course of being performed. For that purpose, the circuit shown in FIG. 5 has a comparator 130 which receives from the encoders E1 and ET, signals CV1 and CVT respectively, which represent the speeds of the carriage 10 and the drum 30 respectively. The comparator 130 is arranged in such a way as to emit a signal EV at logic level 0 at an output 132 connected to the unit 102, if the difference between the speed $V_c$ of the carriage 10 relative to the peripheral speed V of the durm 30 is lower than the preset value $\Delta V$. In the opposite situation, the comparator 130 produces the signal EV at logic level 1. In the latter case, the control unit 102 is so programmed as to generate at an output 134 a signal JV which can be used in one of the known ways to signal a fault. Similarly, the unit 102 is also programmed to signal a difference between the speed of the carriage 12, with respect to the carriage 10. The comparator 130 receives a signal CV2 indicating the speed of the carriage 12, on a line 136 carrying the output of the encoder E2. The signal CV2 is compared in the comparator 130 to the signal CV1 relating to the carriage 10 and, when the two speeds differ from each other by an amount which is greater than $$\pm \Delta V = \frac{V_{c2} - \frac{1}{2}V_{c1}}{V_c}, \frac{V_{c2} - \frac{1}{2}V_{c1}}{V_{c1}}$$

of the order of 0.005, the comparator applies a signal EV' at level 1 to the unit 102, on a line 133. At the same time, at an output 137, the unit 102 produces a signal JV' which can be used in known manner to signal the presence of a fault. The unit 102 also provides, on the basis of the signal EV1, for inhibiting operation of the copier at the end of the cycle being performed.

Figure 6:
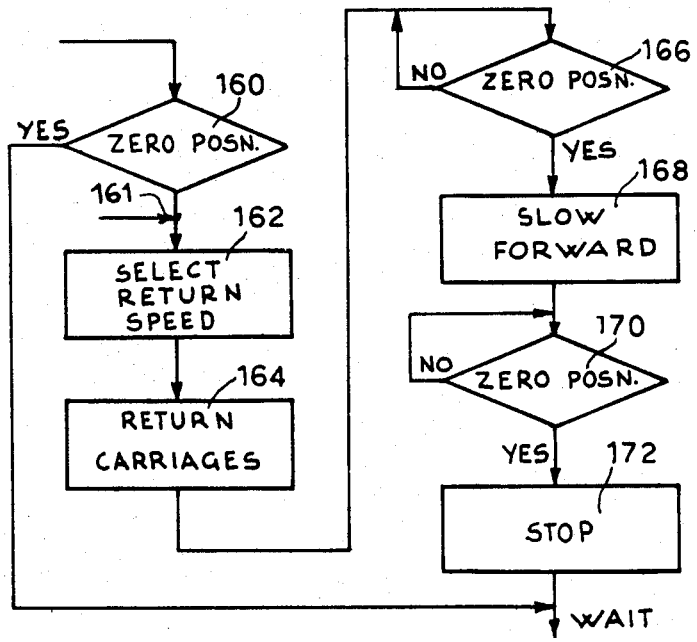
FIG. 6 is a flow chart relating to the circuit shown in FIG. 5.

FIG. 6 shows a flow chart in respect of the program executed by the unit 102 during the phase of preliminary positioning of the carriages 10, 12. Before initiating a copying cycle, the unit 102 checks (block 160) if the carriages 10 and 12 are in the correct position of zero position in which (see FIGS. 1 and 2) two references 93 and 94 which are respectively fixed to the carriages 10 and 12 are disposed facing the respective sensors S1 and S2. Each time that the references 93 and 94 pass in front of the respective sensors S1 and S2, a pulse is passed to the unit 102 on lines 95 and 96.

If the carriages are at the zero position, the system goes straight to a WAIT state, ready for the copying cycle.

If the zero checking operation shows that the carriages are not at the zero position, the unit 102, by means of the speed selector 128 and the generator 110, sets a predetermined speed of return movement of the carriages to the zero position from whatever position in which they are disposed (block 162). Accordingly, the motors M1 and M2 are supplied with power by the amplifiers 122 and 122' for the return movement to the zero position (block 164). The block 166 indicates that the unit 102 is checking the movement of the carriages in front of the sensors S1 and S2. When the sensors supply their pulses to the unit 102 indicating movement of the carriages therepast, by way of the lines 95 and 96, the unit 102 operates to reverse the direction of movement of the carriages 10, 12 at a slow speed, for example 1/10th of the scanning speed (block 168). Blocks 170 and 172 successively indicate that the unit 102 is checking whether the carriages are passing the sensors S1 and S2 for a second time and, in the affirmative case, it takes steps to stop the motors M1 and M2 as soon as the encoders E1 and E2 produce the signal ST on the connection 125. At that point, the copier remains in the WAIT state, ready to initiate a copying cycle.

FIG. 7 shows a flow chart in respect of the program executed by the control unit 102 for checking the movement of the carriages 10 and 12 during the copying cycle. When a PRINT button (not shown in the drawings) of the copier is pressed, to initiate a copying cycle, the unit 102 checks (block 180 in FIG. 7) if the information supplied by the converter 144 contains a request for reduction or enlargement. In the affirmative situation, in accordance with the instructions of the blocks 184 and 186, the unit 102 calculates the fresh value of the distance D (see FIG. 2) of the carriage 12 with respect to the carriage 10 and the fresh position of the lens 25 on the basis of a calculation table contained in the memory 107, and accordingly supplies power to the motor M2 and the motor MP to position the carriage 12 and the lens 25 at their respective fresh positions. The comparison blocks 190 and 194 indicate that the unit 102 is checking if the carriage 12 and the lens 25 have assumed the position calculated in the blocks 184 and 186. The following block 202 contains the instructions for calculating the speeds of the carriages 10 and 12 on the basis of the reducing or enlarging ratio set in the converter 144. On the basis of the calculated speed values, the unit 102 selects the speed by means of the speed selector 128 and controls the generator 110 to generate a frequency corresponding to the set speed, for checking thereof. Consequently, the motors M1 and M2 are supplied with power from the amplifiers 122 and 122' (block 204). If there is no reduction or enlargement, control passes directly from decision 180 to block 204 and the motors M1 and M2 employ the preset speeds for normal 1:1 copying.

Subsequently blocks 206–216 represent the instructions produced by the unit 102 for moving the carriages 10 and 12, comprising the phases of controlled accelaration, travel at a constant speed and return to the initial position at high speed. The block 228 contains the instructions for verifying whether the carriages at the end of the return travel are correctly stopped in the zero position. If not, the program is returned to point 161 in FIG. 6 to effect correct positioning of the carriages at the zero position. Checking in respect of the speeds of the carriages 10 and 12 is controlled by the instructions of the blocks 218–226 and is effected by sampling, for example at time intervals of 0.1 second, by measuring the instantaneous speed of the carriages (block 218).

The comparator 130 compares the speed signals CV2 and CV1 respectively supplied by the encoders E2 and E1 and applies the signal EV at logic level 0 to the unit 102 if the speeds of the two carriages are within the above-indicated tolerances, while signal EV goes to logic level 1 if the two speeds differ excessively (block 220).

Similarly, the comparator periodically compares the speed of the carriage 10 to the speed of the drum 30 (block 224). When the comparator 130 applies signals EV or EV' at logic level 1 to the unit 102, operation of the copier is halted at the end of the cycle being performed, in accordance with the instructions of block 226.

The modifications to FIG. 7 to cater for the alternative embodiment of FIGS. 3 and 4 will be readily apparent. Block 186 must additionally involve provision of a signal on line 67 (FIGS. 4 and 5) to disengage the clutch 66 and close the switch I while the carriage 12 is being positioned. Blocks 208, 210 and 216 are omitted as the carriage 12 is also driven by the motor M1 during blocks 206, 212, 214. Block 202 calculates a single carriage speed and block 204 energises M1 only (since switch I is open).

For the main embodiment, the line 67 (FIG. 5) can be omitted and the switch I is replaced by a permanent connection, as indicated by a broken line. According to the present invention, the motors M1 and M2 may be D.C. or A.C. motors, D.C. brush less motors or any known electrically controllable actuators.

We claim:

1. Apparatus for scanning a fixed original to be copied on a copying machine with different reduction/enlargement ratios comprising first and second mirror carriages independently movable in the same direction parallel to said original to direct the scanned original image toward a rotatable image receptor, means for selecting one of said reduction/enlargement ratios, a first motor connected to said first carriage and conditionable to move it at a preset speed according to the selected reduction/enlargement ratio, a second motor connected to said second carriage and conditionable to move said second carriage at a secoond speed in predetermined ratio to said preset speed, and a control circuit responsive to said selected ratio to independently condition said first motor to move the first carriage and said second motor to simultaneously move the second carriage at said second speed, whereby said second carriage travels at said second speed simultaneously with said first carriage to scan said original irrespective of the variations of said preset speed.

2. Apparatus for scanning a fixed original to be copied on a copying machine with different reduction/enlargement ratios comprising first and second mirror carriages independently movable in the same direction parallel to said original to direct the scanned original image toward a rotatable image receptor, a first motor connected to said first carriage to move it at a preset speed according to a selected reduction/enlargement ratio, a control circuit responsive to said selected ratio to activate said first motor at said preset speed, a second motor connected to said second carriage and activated by said control circuit to move said second carriage simultaneously with said first carriage at a second speed in predetermined ratio to said preset speed, said control circuit comprising a frequency generator controlled by a control unit to generate reference frequencies selectively variable according to said selected reduction/enlargement ratio, a first driving circuit to drive said first motor at said preset speed depending on said reference frequencies, a second driving circuit independent of said first one to drive said second motor at said second speed, and a frequency divider connected between said generator and said second driving circuit to divide by two each of said selected frequencies thereby to control said driving circuit so that said second motor is rotated at half speed with respect to said first motor, whereby said second carriage travels at said second speed simultaneously with said first carriage to scan said original irrespective of the variations of said preset speed.

3. Apparatus according to claim 2 wherein each of said first and second driving circuits comprises a motor speed sensor, a phase comparator, a digital analog converter, a speed selector circuit and a power amplifier to drive said first and second motors respectively at predetermined target speeds correlated to said selected reduction/enlargement ratios.

4. Apparatus according to claim 2 including a threshold level comparator for comparing the relative speeds of the first and second carriages, said comparator being inactive if said relative speeds differ from each other by less than a predetermined amount, sais comparator producing an error signal when said relative speeds differ by more than said predetermined amount, whereby, when said signal is produced, the machine operation is stopped.

5. Apparatus for scanning a fixed original to be copied on a copying machine with different reduction/enlargement ratios, comprising first and second mirror carriages movable in the same direction parallel to said original to direct the scanned original image along an optical path toward a rotatable image receptor, a pair of parallel shafts rotatably mounted on said machine for rotation at the same rotational speed, each shaft having a pulley fixedly mounted thereon and connected respectively to said first carriage and to said second carriage by cables wound therearound, the diameter of the pulley of said second shaft being one-half that of the pulley of said first shaft, an electrically energizable clutch connected between said first and second shafts of said pair to selectively disengage said second shaft from the first one, a first motor connected to said first shaft to move said first carriage at different speeds according to said ratio, and simultaneously said second carriage at a half speed relative to the first carriage and a second motor connected to said second shaft operative before the scanning travel of said first carriage to establish an initial position of said second carriage selectively spaced from the first carriage according to said ratio when said clutch is energized whereby, for each selected ratio the original is correctly scanned by both said carriages and the length of said optical path is varied according to said selected ratio.

6. Apparatus according to claim 5 wherein said second motor is energized through a selectively operable electric power switch, said switch being opened to disconnect said motor electrically during the scanning operation, whereby said second motor, while so disconnected, does not waste electric power.

* * * * *